(12) United States Patent
Yoo et al.

(10) Patent No.: US 9,460,000 B2
(45) Date of Patent: Oct. 4, 2016

(54) METHOD AND SYSTEM FOR DYNAMICALLY CHANGING PAGE ALLOCATOR

(71) Applicant: SAMSUNG ELECTRONICS CO., LTD., Suwon-si (KR)

(72) Inventors: Junghyun Yoo, Seoul (KR); Sungmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 279 days.

(21) Appl. No.: 14/158,134

(22) Filed: Jan. 17, 2014

(65) Prior Publication Data

US 2014/0201490 A1    Jul. 17, 2014

(30) Foreign Application Priority Data

Jan. 17, 2013   (KR) .................. 10-2013-0005433

(51) Int. Cl.
*G06F 12/02*   (2006.01)
(52) U.S. Cl.
CPC .................... *G06F 12/023* (2013.01)
(58) Field of Classification Search
CPC .................................................... G06F 12/023
See application file for complete search history.

(56) References Cited

U.S. PATENT DOCUMENTS

| | | | |
|---|---|---|---|
| 5,225,065 A | * | 7/1993 | Mettes ................. G01N 27/423 204/400 |
| 7,035,989 B1 | | 4/2006 | Hinker et al. |
| 2005/0138320 A1 | | 6/2005 | Mitarai et al. |
| 2009/0089531 A1 | | 4/2009 | Johnson et al. |
| 2012/0284483 A1 | | 11/2012 | Foster et al. |
| 2012/0303878 A1 | | 11/2012 | Haas et al. |

OTHER PUBLICATIONS

Andrew S. Tanenbaum, Modern Operating Systems, 1992, Prentice Hall, Inc., p. 281.*
International Search Report for PCT/KR2014/000525 dated Apr. 30, 2014 [PCT/ISA/210].

* cited by examiner

*Primary Examiner* — Reginald Bragdon
*Assistant Examiner* — Mehdi Namazi
(74) *Attorney, Agent, or Firm* — Sughrue Mion, PLLC

(57) ABSTRACT

A method and a system of dynamically changing a page allocator are provided. The method includes determining a state of a page allocation system; and forking a child page allocator from a parent page allocator, or merging a child page allocator into a parent page allocator, based on the determination.

19 Claims, 20 Drawing Sheets

METHOD AND SYSTEM FOR DYNAMICALLY CHANGING PAGE ALLOCATOR

CROSS-REFERENCE TO RELATED APPLICATION

This application claims priority from Korean Patent Application No. 10-2013-0005433, filed on Jan. 17, 2013, which is hereby incorporated by reference for all purposes as fully set forth herein.

BACKGROUND

1. Field

Systems and methods consistent with exemplary embodiments relate to a page allocation, and more particularly, to a method and a system for dynamically changing a page allocator, which can effectively manage a page pool by forking or merging page allocators in consideration of a system's state.

2. Description of the Related Art

In recent years, a multi-core hardware environment in which a plurality of processors (or CPU cores) are operated in one system has been more widely used. That is, after a dual core product entered the market, this trend has been more noticeable, and now, a many-core processor age is being opened beyond a multi-core environment.

In accordance with such a period background, chip densities of the processors have been increasing and multi-core architectures have been developed, so that on-chip processing resources have been increasing.

A multi-core chip recently has more than 10 processors, and one chip is expected to have several hundred processors in the near future.

As the number of processors included in one system increases, it becomes more advantageous to provide scalability of operating systems. That is, it is advantageous to control operations of main components of the operating system to effectively utilize a plurality of processors, and a page allocation scheme of a memory should be reconsidered according to this aspect.

The page allocation schemes according to the related art correspond to a global page allocation scheme and a local page allocation scheme, and page allocation schemes are statically determined in the two schemes.

FIG. 1 schematically illustrates a global page allocation scheme, and FIG. 2 schematically illustrates a local page allocation scheme.

Referring to FIG. 1, a global page allocator globally manages pages through a pool including a plurality of pages. A request for allocating a plurality of pages and a request for deallocating a plurality of pages are simultaneously processed through lock segmentation for one pool.

Such a global page allocator manages all the pages through one page allocator, so that it is easy to minimize memory fragmentation but there is a disadvantage in that scalabilities for the request for allocating a plurality of pages and the request for deallocating a plurality of pages deteriorate. Although a buddy allocator of a Linux system increases concurrency of a page pool management data access through lock segmentation in order to address this problem, there is a limit to the improvement in the scalability through this process.

Referring to FIG. 2, a local page allocator divides a plurality of pages into a plurality of pools, and manages each of the pools through a separate page allocator. Since each of the page allocators operates independently, each of the page allocators simultaneously processes requests for allocating a plurality of pages and requests for deallocating a plurality of pages. Since each of the local page allocators manages a separate page pool, a perfect concurrency for processing the requests for allocating and deallocating a page is ensured.

However, the local page allocator manages the pages while dividing all the pages, so that when memory loading is unbalanced, there may be a lack of pages even when there are sufficient free pages from a view point of the whole page pool. Further, when an allocator to which pages are allocated and an allocator which requests cancellation of the allocating are different from each other, there is a disadvantage in that a page fragmentation phenomenon may be generated among the allocators. The allocators may communicate with one another in an attempt to avoid this phenomenon, but there is a disadvantage in that the communication increases overhead in the page pool management.

Thus, there is a trade-off between advantages and disadvantages of the global allocation scheme and the local allocation scheme.

SUMMARY

One or more exemplary embodiments provide a method and a system for dynamically changing a page allocator, which can effectively manage a page pool by forking or merging page allocators in consideration of a system's state.

According to an aspect of an exemplary embodiment, there is provided a system of dynamically changing a page allocator, the system including a page allocator configured to allocate or deallocate a page corresponding to a memory address according to a request for allocating or deallocating the page; and a coordinator configured to determine a state of the system, and fork a child page allocator from the page allocator, which servers as a parent page allocator, based on the determination.

The coordinator may merge the forked child page allocator into the parent allocator based on the determination.

According to another aspect of an exemplary embodiment, there is provided a method of dynamically changing a page allocator in a page allocation system, the method including determining a state of the page allocation system; and forking a child page allocator from a parent page allocator, or merging a child page allocator into a parent page allocator, based on the determination.

According to another aspect of an exemplary embodiment, there is provided a system of dynamically changing a page allocator, the system comprising a plurality of page allocators, each page allocator configured to allocate or deallocate a page corresponding to a memory address according to a request for allocating or deallocating the page; and a coordinator configured to, in response to the request received by one of the plurality of page allocators, determine a state of the system, and, based on the determination, fork a child page allocator from the receiving page allocator, or merge the receiving page allocator into a parent page allocator of the receiving page allocator.

BRIEF DESCRIPTION OF THE DRAWINGS

The above and/or other aspects will be more apparent from the following detailed description of exemplary embodiments in conjunction with the accompanying drawings, in which.

DETAILED DESCRIPTION OF EXEMPLARY EMBODIMENTS

Figure 1:
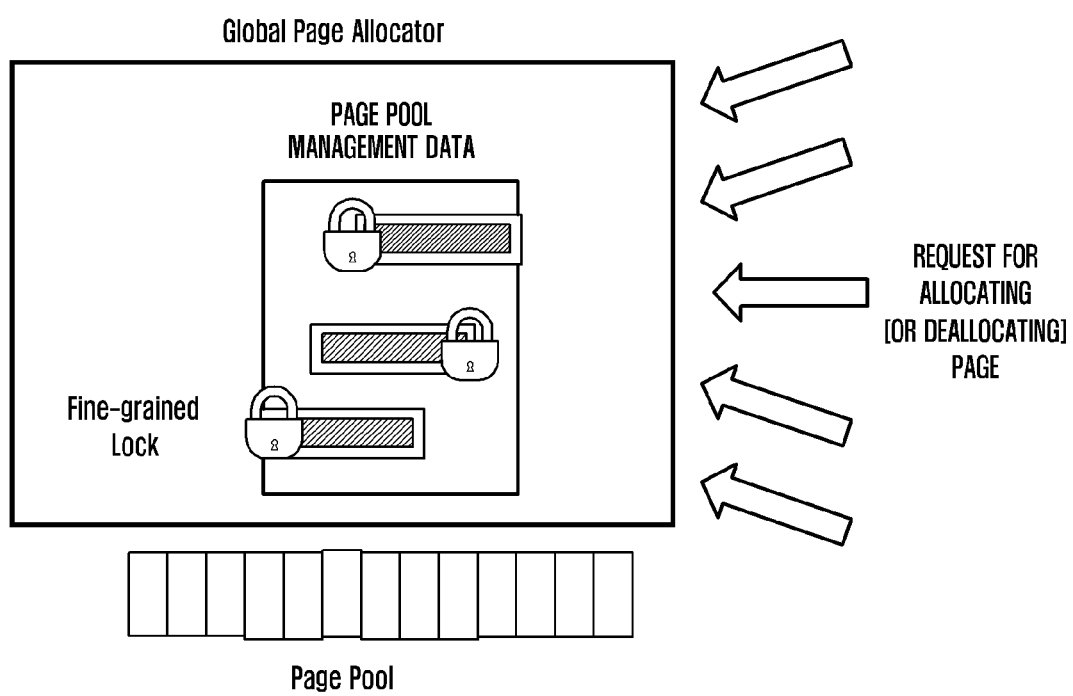
FIG. 1 schematically illustrates a global page allocation scheme.
Figure 2:
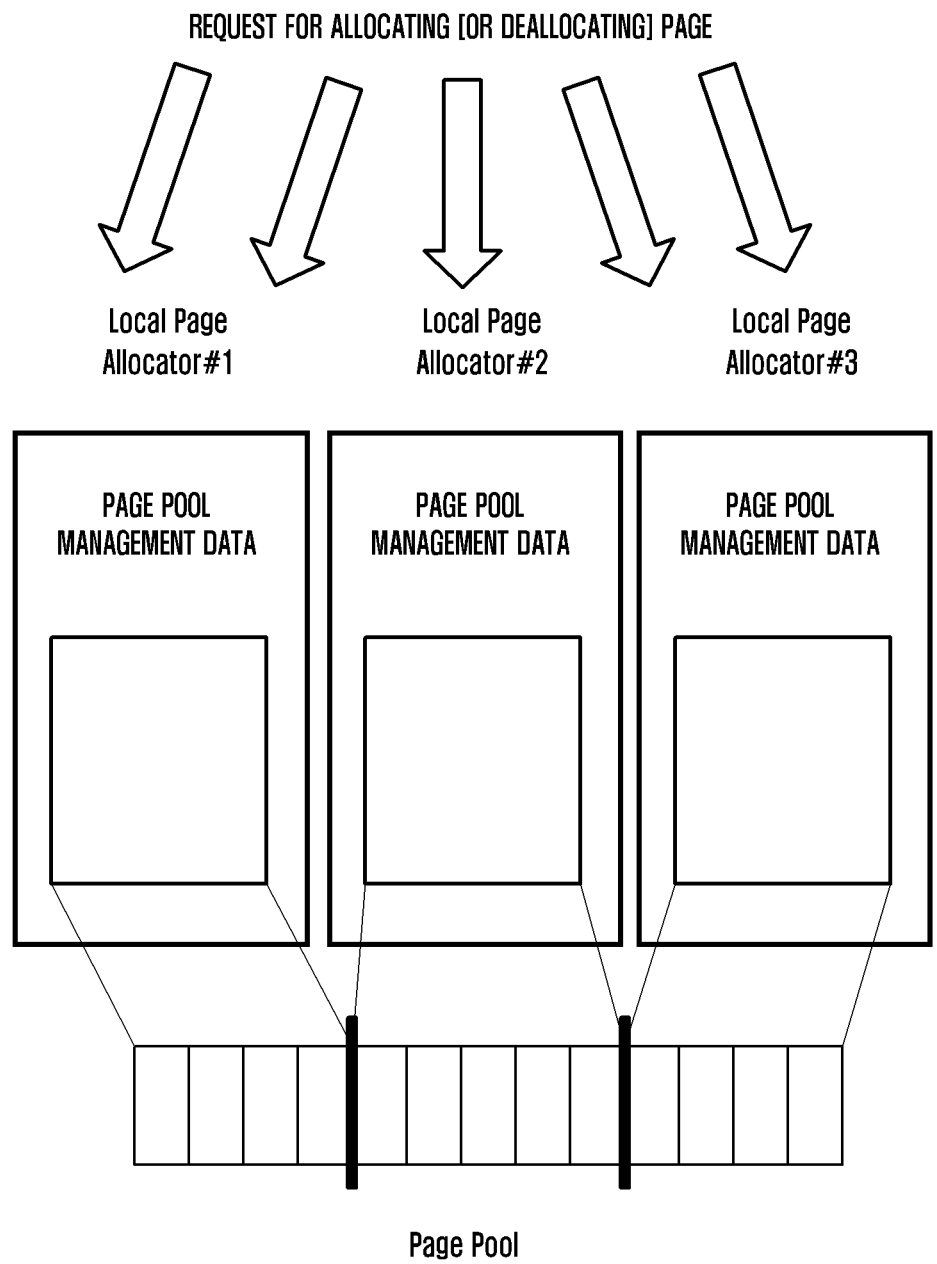
FIG. 2 schematically illustrates a local page allocation scheme.

In the following description, only a part needed for understanding an operation according to an exemplary embodiment will be described, and a detailed description of other parts will be omitted when it may make the subject matter rather unclear.

In the following description, the terms or words used in the specification and claims are not necessarily interpreted using typical or dictionary limited meanings, and are constructed as meanings and concepts conforming to the technical spirit of the present inventive concept based on the principle that the inventors can appropriately define the concepts of the terms to explain the present inventive concept in the best manner. Thus, since exemplary embodiments disclosed in the present specification and configurations illustrated in the drawings are just the most preferable exemplary embodiments and do not represent all the technical spirits of the present inventive concept, it should be understood that various equivalents and variations which can substitute for these exemplary embodiments and configurations may be made at the time of filing of the application.

Hereinafter, configurations related to functions of the present inventive concept and roles of the configurations will be described in more detail. Herein, characteristics of the present inventive concept are not limited to the above-mentioned examples. That is, the characteristics of the present inventive concept may be understood to include shape changes of configurations and additional functions which will be described as well as the above-mentioned examples.

Figure 3:
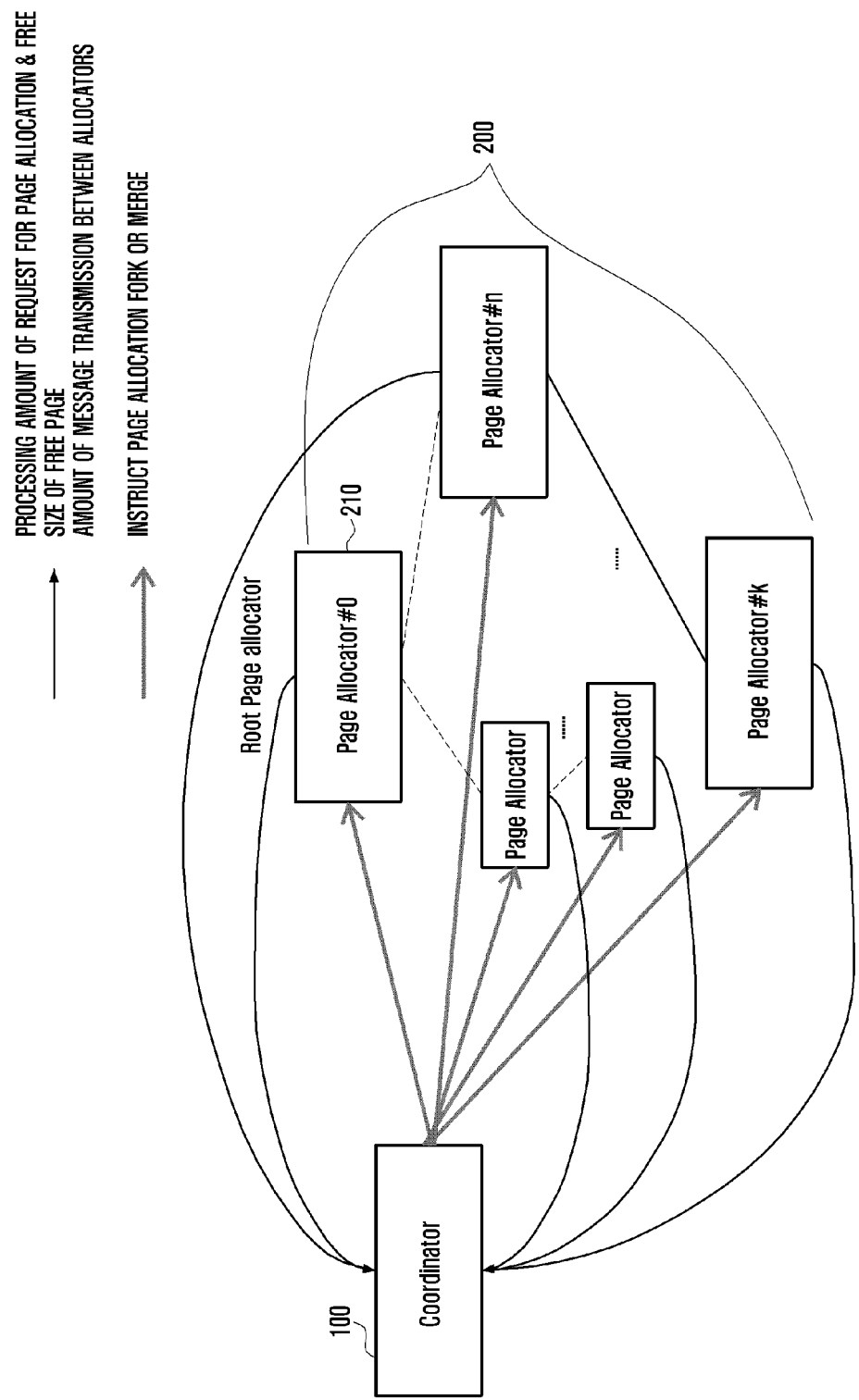
FIG. 3 schematically illustrates a system for dynamically changing a page allocator in a many core environment according to an exemplary embodiment.

FIG. 3 schematically illustrates a system for dynamically changing a page allocator in a many core environment according to an exemplary embodiment.

Referring to FIG. 3, a system for dynamically changing a page allocator includes a coordinator 100 and at least one page allocator 200.

The coordinator 100 receives status information on a status during operation from the page allocators 200. That is, the page allocators 200 periodically send information on a processing amount of allocating and deallocating a page, information on a size of free pages in a current page pool, and information on a message transmission amount between the page allocators. The page allocators 200 may send the information cyclically.

The coordinator 100 may determine a system's state based on the information received from the page allocators 200. For example, the coordinator 100 may determine the system's state as at least one of a state where communication between the plurality of page allocators is in an overhead state, a state where the number of requests for allocating and/or deallocating a page by the page allocators becomes lower than a reference value or higher than a reference value, a state where a workload of the page allocators is smaller than a reference value or larger than a reference value, and a state where a size of the whole free page corresponding to the page allocators is smaller than a reference value or larger than a reference value. Each of the reference values may be predetermined.

When the workload of the page allocator 200 becomes larger than the reference value, the coordinator 100 may partially adopt a more local page allocation scheme through performing forking of the page allocators, so as to improve the scalability.

In contrast, when it is determined that the global page allocation scheme is more advantageous than the local page allocation scheme since the workload of the page allocator 200 becomes small or the size of the whole free page becomes small, a more global page allocation scheme may be adopted through performing merging between the page allocators.

In this way, the coordinator 100 according to the present exemplary embodiment may dynamically change the page allocation scheme according to the system's state.

Figure 4:
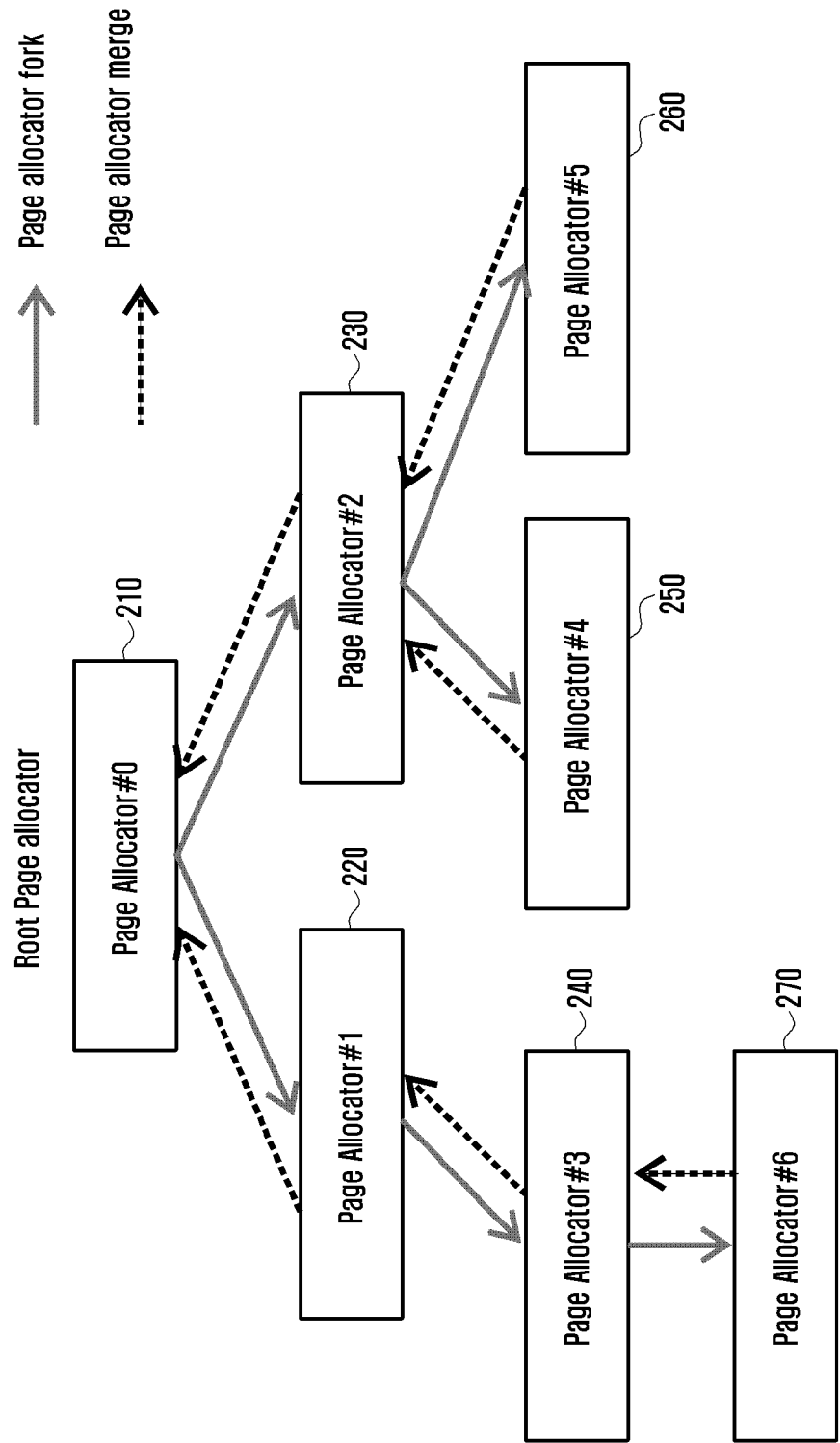
FIG. 4 schematically illustrates an example of a family tree of a dynamic page allocation system according to an exemplary embodiment.

FIG. 4 schematically illustrates an example of a family tree of a dynamic page allocation system according to an exemplary embodiment.

Referring to FIG. 4, the dynamic page allocator includes a root page allocator which is a root page allocator (Page Allocator #0) 210 corresponding to initialization of the dynamic page allocation system. Further, the dynamic page allocator includes a first page allocator (Page Allocator #1) 220 and a second page allocator (Page Allocator #2) 230 forking from the root page allocator (Page Allocator #0) 210, a third page allocator (Page Allocator #3) 240 forking from the first page allocator (Page Allocator #1) 220, a sixth page allocator (Page Allocator #6) 270 forking from the third page allocator (Page Allocator #3) 240, and a fourth page allocator (Page Allocator #4) 250 and a fifth page allocator (Page Allocator #5) 260 forking from the second page allocator (Page Allocator #2) 230.

In this way, the page allocators of the dynamic page allocation system are repeatedly connected to each other in a relation of parent and child. In accordance with instruction of the coordinator 100, the child page allocator is forked from the parent page, or the child page allocator is merged into the parent page allocator. The forking and merging operations are executed when the page allocators are in relation of parent and child.

The data transmission between the coordinator 100 and the page allocator 200 or between the page allocators 200 may be implemented based on message transmission or a shared memory.

By the above-mentioned method, the coordinator 100 may dynamically change the page allocation scheme, so as to effectively manage the pages according to the system's state.

FIGS. 5 to 8 schematically illustrate a forking operation of a dynamic page allocation system according to an exemplary embodiment.

Figure 5:
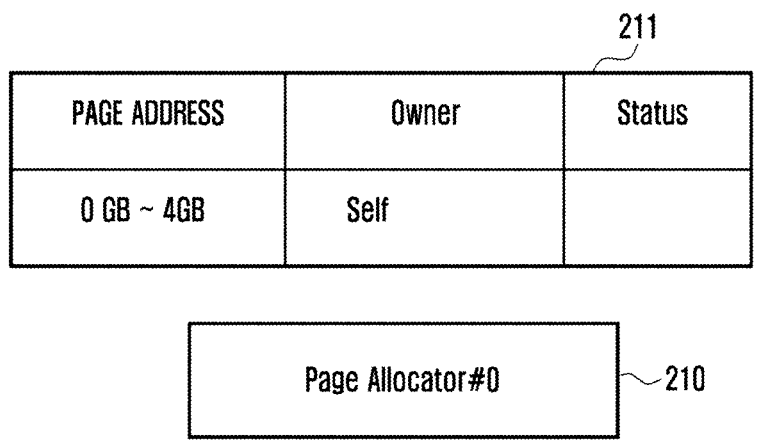
FIGS. 5 to 8 schematically illustrate a forking operation of a dynamic page allocation system according to an exemplary embodiment.

FIG. 5 illustrates a root page allocator 210 corresponding to initialization of the dynamic page allocation system, and a root page pool management data 211 managed by the root page allocator 210.

The root page pool management data 211 may store itself as an owner of a page range of, for example, 0 GB to 4 GB (e.g., record "self" in the blank named "owner"). A status of the page range of 0 GB to 4 GB corresponds to an area indicating whether the corresponding page range is in an allocated status "Alloc" or a deallocated status "Free". Since the status relates to an allocated status of the corresponding page, the status will be described with reference to FIGS. 14 to 16 although not described in FIGS. 5 to 8.

Figure 6:
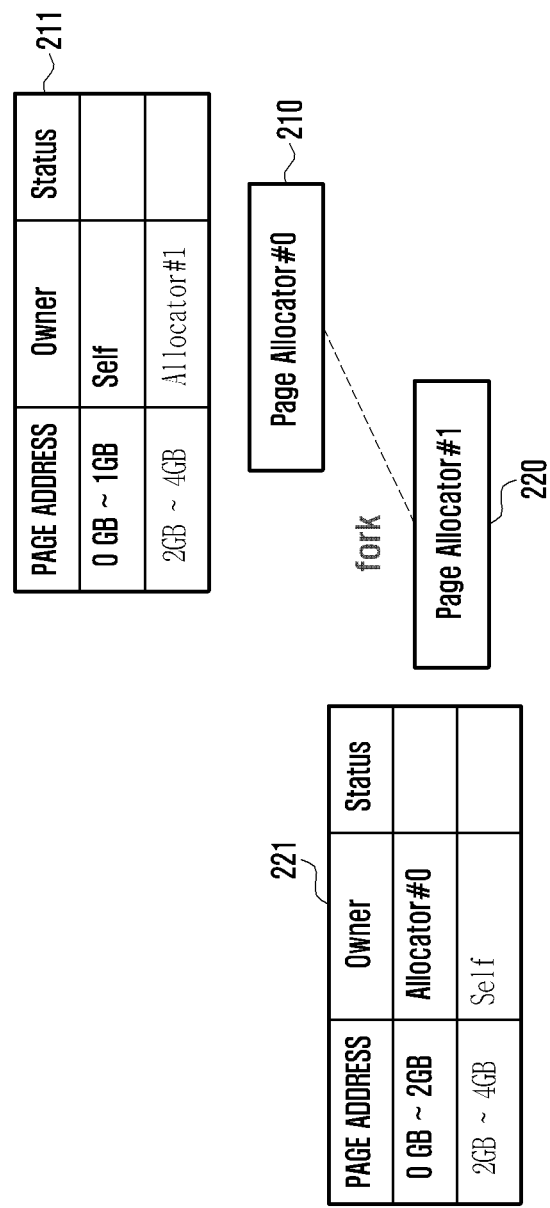

Referring to FIG. 6, the coordinator 100 primarily forks a child page allocator, in this case the first page allocator 220, from the root page allocator 210.

In detail, the coordinator 100 generates a child page allocator, i.e., the first page allocator 220, corresponding to the root page allocator 210 as the primary forking, and passes ownership of a part of pages owned by the root page allocator 210 to the first page allocator 220.

For example, the owner of a page range of 2 GB to 4 GB among a page range of 0 GB to 4 GB of the root page pool management data 211 is changed from itself Allocator #0 to the first page allocator Allocator #1. The root page allocator 210 corresponds to the parent page allocator, and the first page allocator 220 corresponds to the child page allocator.

Figure 7:
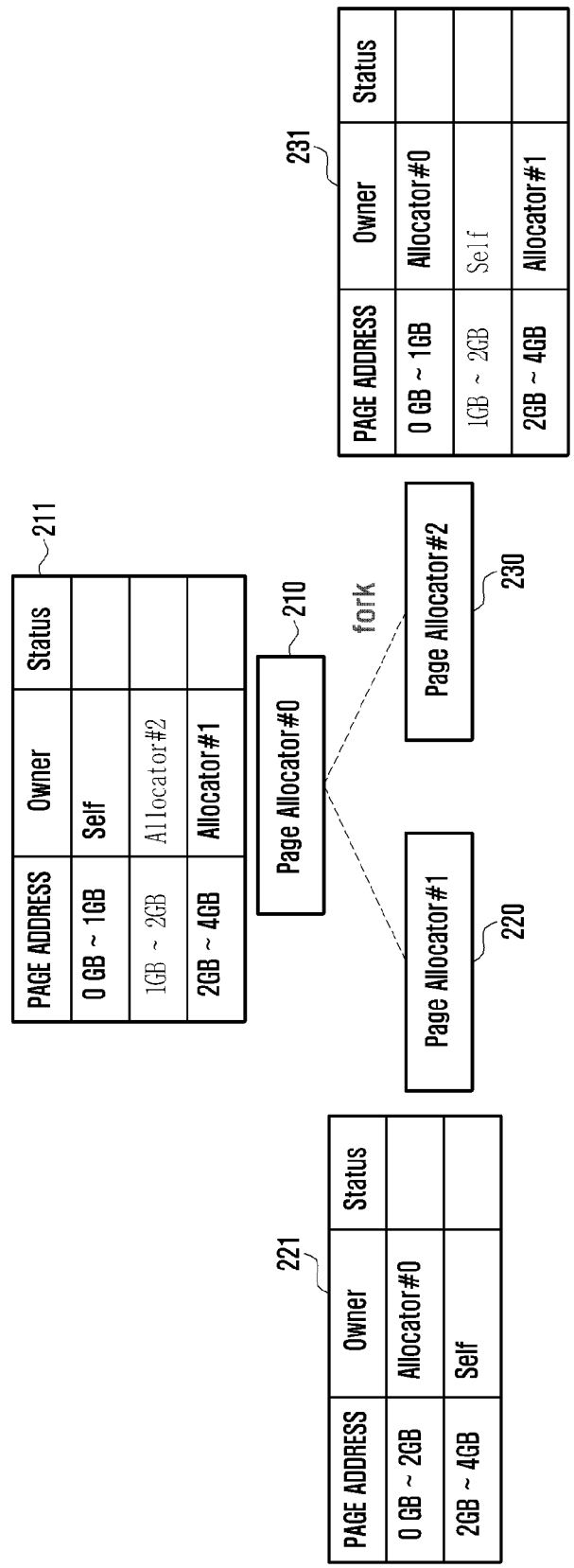

Referring to FIG. 7, the coordinator 100 may perform secondary forking subsequent to the primary forking. That is, the coordinator 100 generates the second page allocator 230 as another child page allocator of the root page allocator 210 and passes ownership of a part of pages among a page range owned by the root page allocator 210 to the second page allocator 230.

For example, the ownership of a page range of 1 GB to 2 GB owned by the root page allocator 210 is passed to the second page allocator 230. Accordingly, the root page pool management data 211 changes an owner of a page range of 1 GB to 2 GB from itself Allocator #0 to a second page allocator Allocator #2 and stores the changed information, and a second page pool management data 231 stores itself as an owner of a page range of 1 GB to 2 GB.

Thus, after the above allocations, the root page pool management data 211 stores itself, i.e. "Self", as an owner of a page range of 0 GB to 1 GB, stores the second page allocator Allocator #2 as an owner of a page range of 1 GB to 2 GB, and stores the first page allocator Allocator #1 as an owner of a page range of 2 GB to 4 GB.

The second page pool management data 231 stores the root page allocator Allocator #0 as an owner of a page range of 0 GB to 1 GB, stores itself, i.e., "Self", as an owner of a page range of 1 GB to 2 GB, and stores the first page allocator Allocator #1 as an owner of a page range of 2 GB to 4 GB.

It can be seen that the owner of the page range of 0 GB to 2 GB of a first pool management data 221 is changed from the first page allocator 220 to the root page allocator 210 through the root page pool management data 211 and the second page pool management data 231. That is, the first pool management data 221 still indicates that the page range 0 GB to 2 GB is owned by the root page allocator 220 because the first page allocator 220 and the second page allocator 230 are both children of the parent root page allocator 210 and thus do not communicate directly with each other.

Figure 8:
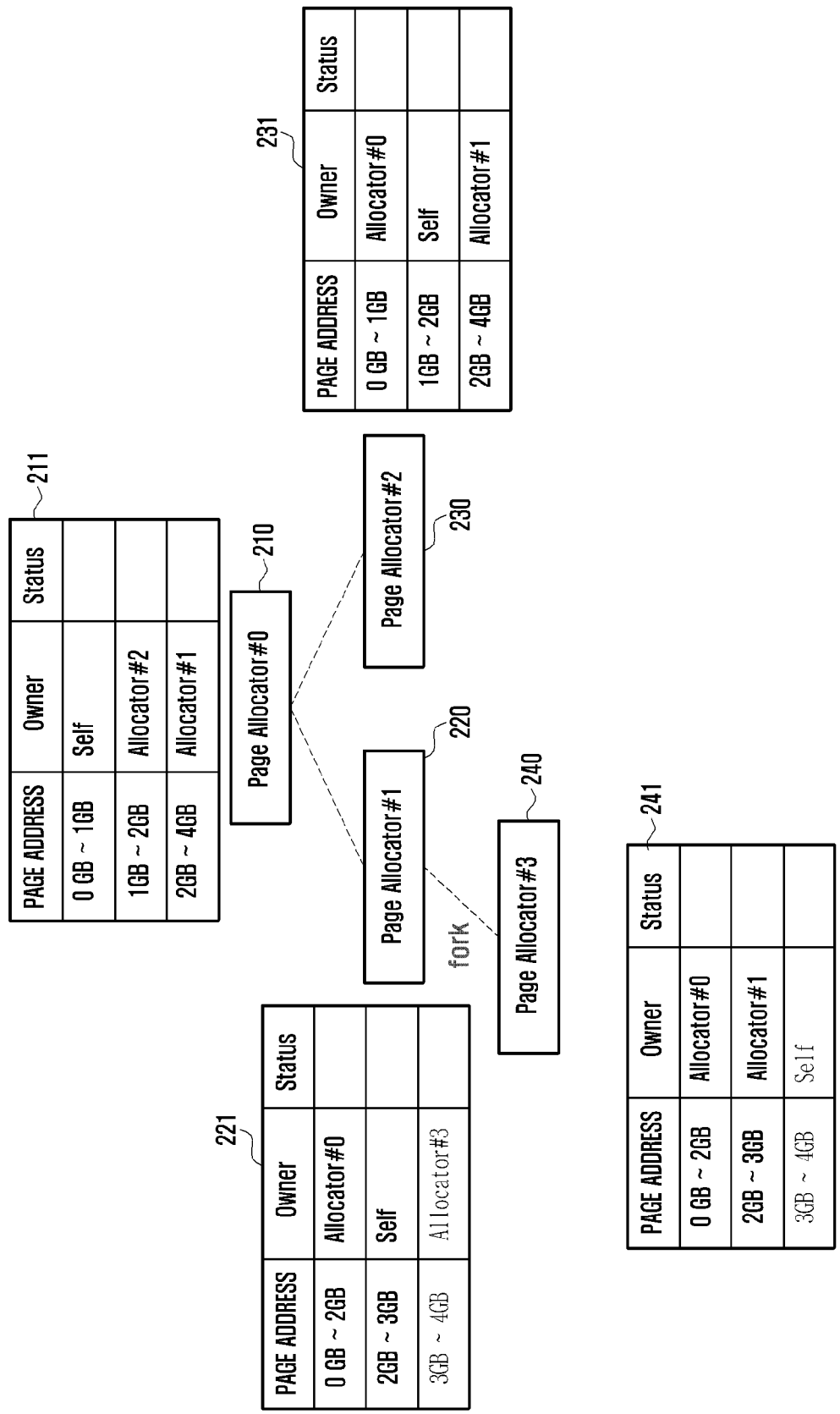

Referring to FIG. 8, the coordinator 100 forks the first page allocator 220 which has been a child page allocator of the root page allocator 210 to generate the third page allocator 240. At this time, the first page allocator 220 acts as a child page allocator for the root page allocator 210 and acts as a parent page allocator for the third page allocator 240.

For example, the ownership of a page range of 3 GB to 4 GB among a page range of 2 GB to 4 GB which the first page allocator 220 has owned is passed to the third page allocator 240. Accordingly, the first page pool manage data 221 changes an owner of a page range of 3 GB to 4 GB from itself, i.e., "Self" or Allocator #1, to the third page allocator Allocator #3 and stores the changed information, and a third page pool management data 241 stores itself, i.e., "Self" as an owner of a page range of 3 GB to 4 GB.

The first page pool management data 221 stores the root page allocator Allocator #0 as an owner of a page range of 0 GB to 2 GB, stores itself, i.e., "Self" as an owner of a page range of 2 GB to 3 GB, and stores the third page allocator Allocator #3 as an owner of a page range of 3 GB to 4 GB.

The third page pool management data 241 stores the root page allocator Allocator #0 as an owner of a page range of 0 GB to 2 GB, stores the first page allocator Allocator #1 as an owner of a page range of 2 GB to 3 GB, and stores itself, i.e., "Self" as an owner of a page range of 3 GB to 4 GB.

FIGS. 9 to 13 schematically illustrate a merging operation of a dynamic page allocation system according to an exemplary embodiment.

Figure 9:
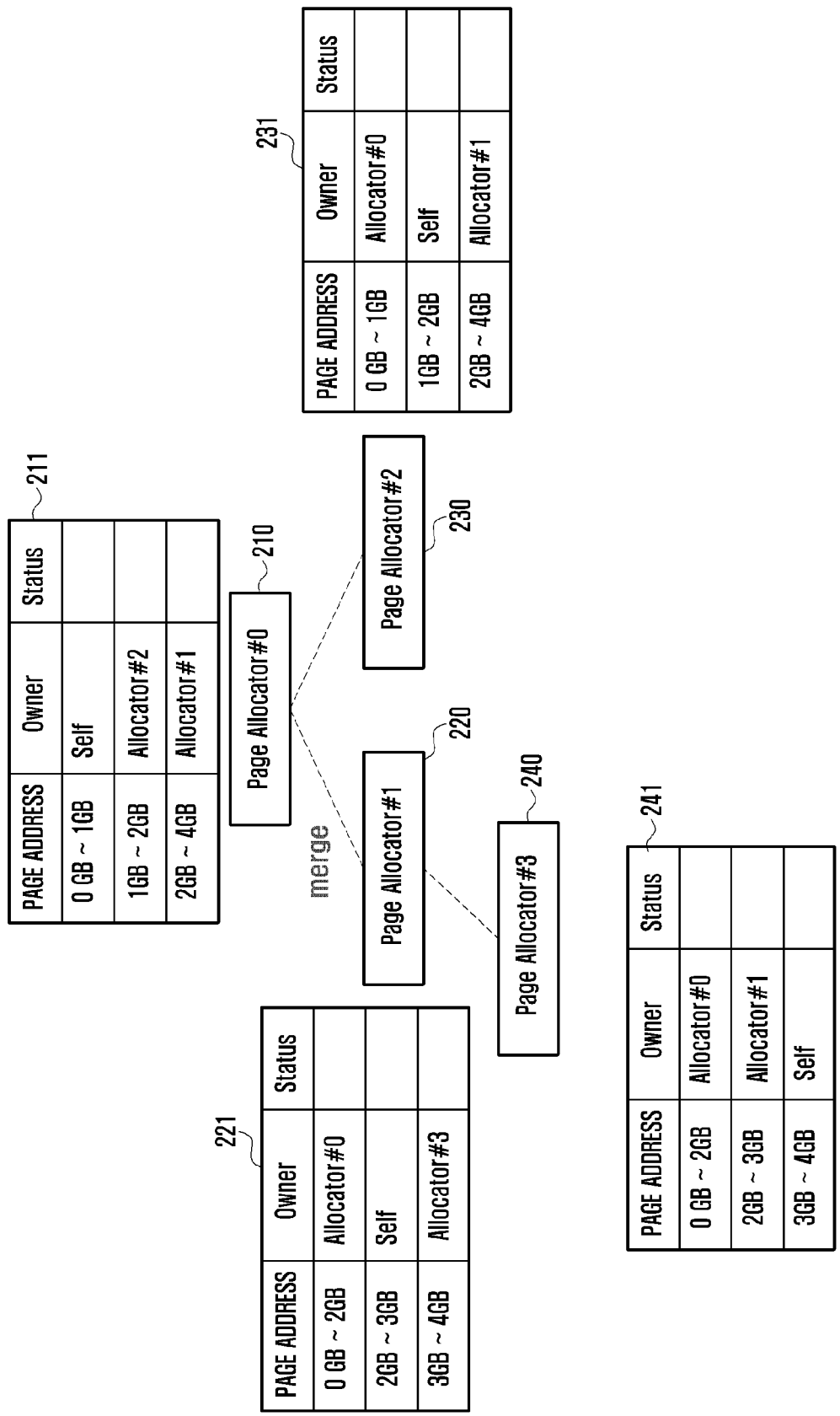
FIGS. 9 to 13 schematically illustrate a merging operation of a dynamic page allocation system according to an exemplary embodiment.
Figure 10:
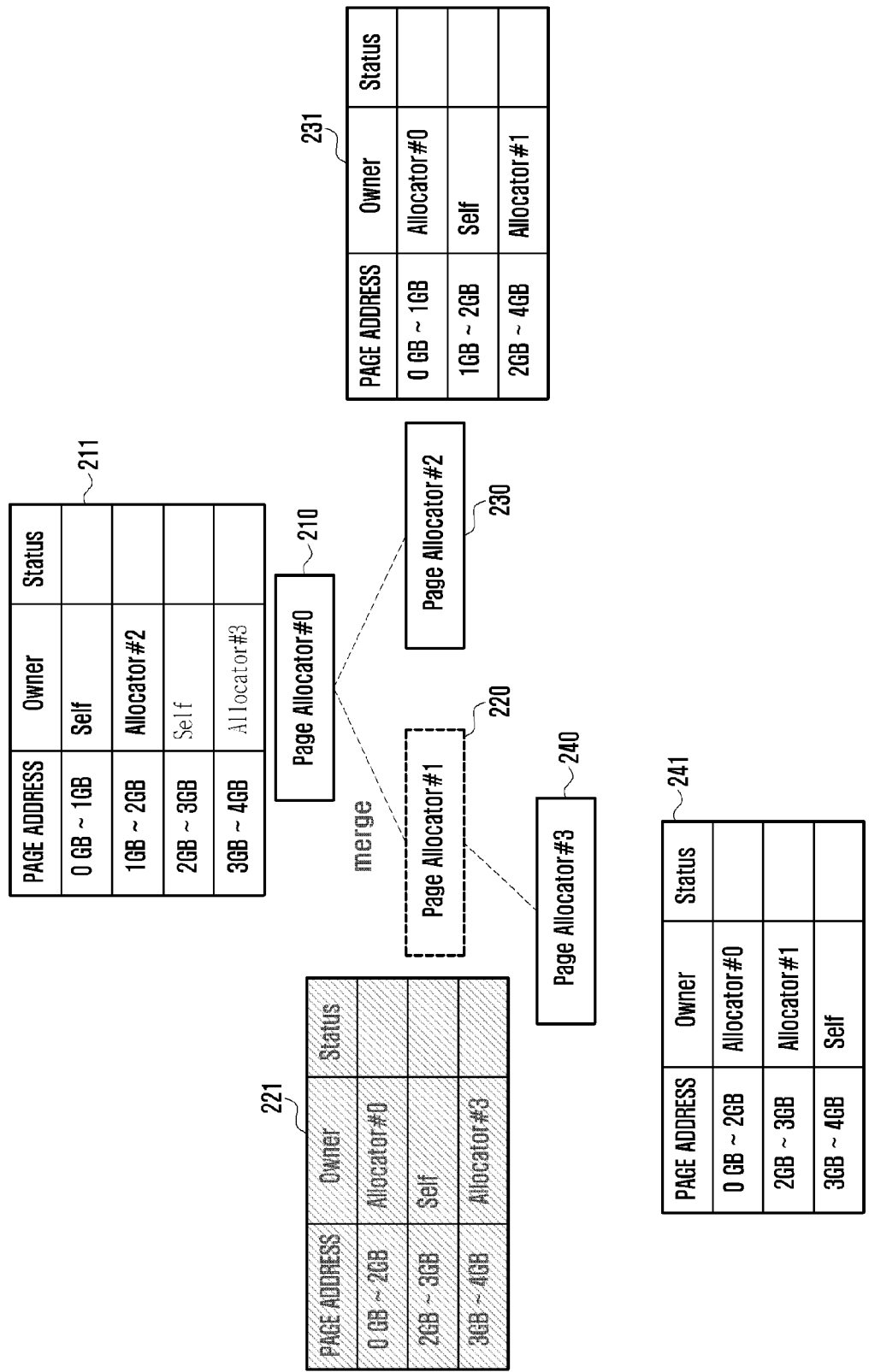

Referring to FIGS. 9 and 10, for example, it is assumed that a status of the dynamic page allocation system continues from and is equal to the status of the system illustrated in FIG. 8. In a state where the root page allocator 210 to the third page allocator 240 are forked, the coordinator 100 may perform an operation of merging the first page allocator 220 into the root page allocator 210 as illustrated in FIG. 10.

In detail, the coordinator 100 merges the first page allocator 220 to the root page allocator 210 as a primary merging by passing the ownership of a page range of 2 GB to 3 GB which the first page allocator 220 has owned to the root page allocator 210.

Accordingly, referring to FIG. 10, the root page pool management data 211 changes the owner of a page range of 2 GB to 3 GB from the first page allocator Allocator #1 to itself, i.e., "Self", changes the owner of a page range of 3 GB to 4 GB from the first page allocator Allocator #1 to the third page allocator Allocator #3, and stores the changed information.

Here, the root page pool management data 211 may update current owner information of the page range of 3 GB to 4 GB through merging the first page allocator 220 into the root page allocator 210.

Meanwhile, when merging the child page allocator, the parent page allocator informs the other child page allocators of owner information of the page range changed by the merging.

Figure 11:
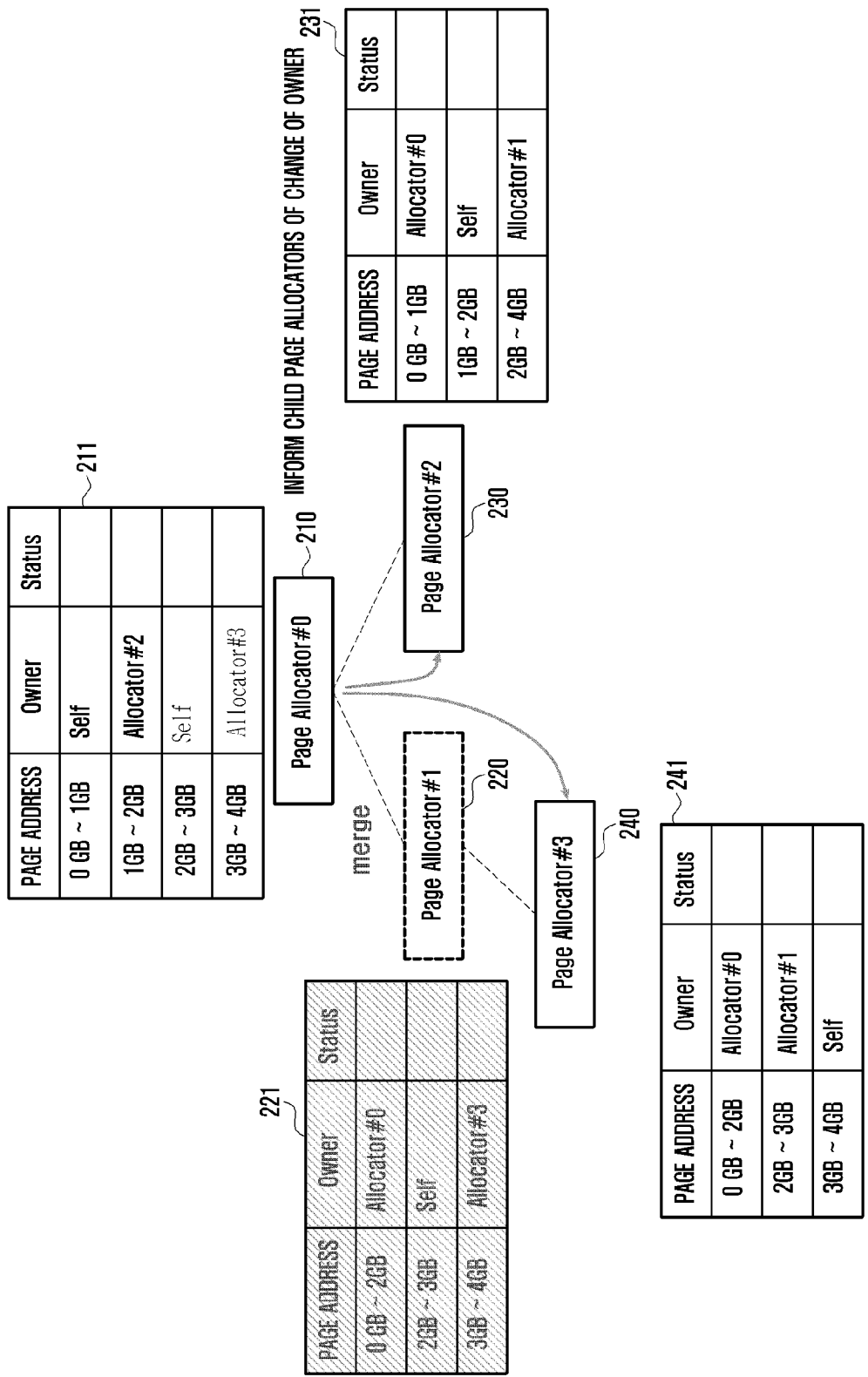

That is, referring to FIG. 11, the root page allocator 210 corresponding to the parent page allocator informs the second page allocator 230 and the third page allocator 240 corresponding to the other child page allocators that the owners of the page ranges of 2 GB to 3 GB and 3 GB to 4 GB are changed to the root page allocator 210 and the third page allocator 240, respectively.

Figure 12:
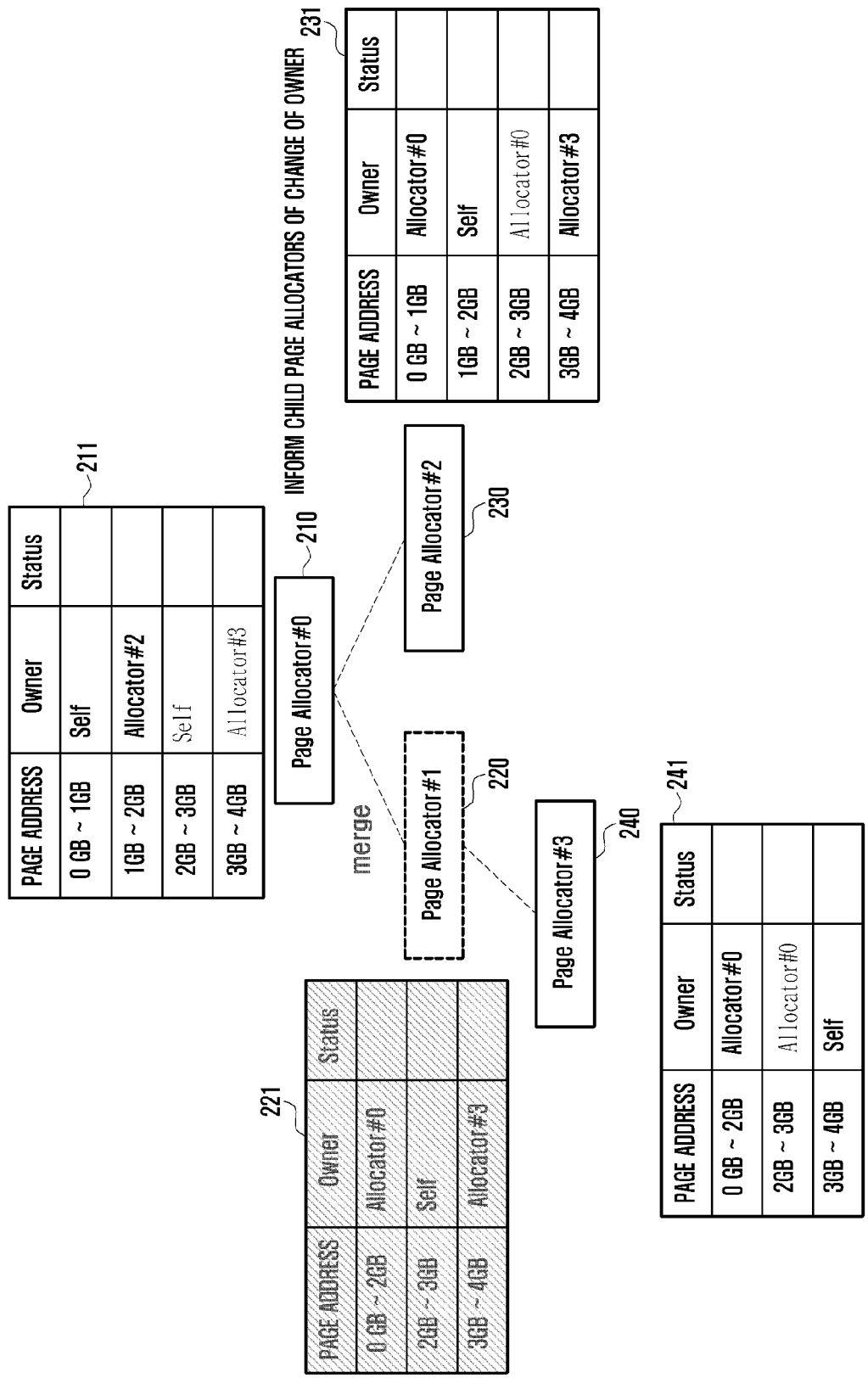

Referring to FIG. 12, the second page allocator 230 which has received information on the changed owners from the root page allocator 210 changes the owner of the page range of 2 GB to 3 GB from the first page allocator Allocator #1 to the root page allocator Allocator #0, changes the owner of the page range of 3 GB to 4 GB from the first page allocator Allocator #1 to the third page allocator Allocator #3, based on the received changed owner information, and stores the changed information.

Similarly, the third page allocator 240 which has received information on the changed owner from the root page allocator 210 changes the owner of the page range of 2 GB to 3 GB from the first page allocator Allocator #1 to the root page allocator Allocator #0 based on the received changed owner information, and stores the changed information.

Figure 13:
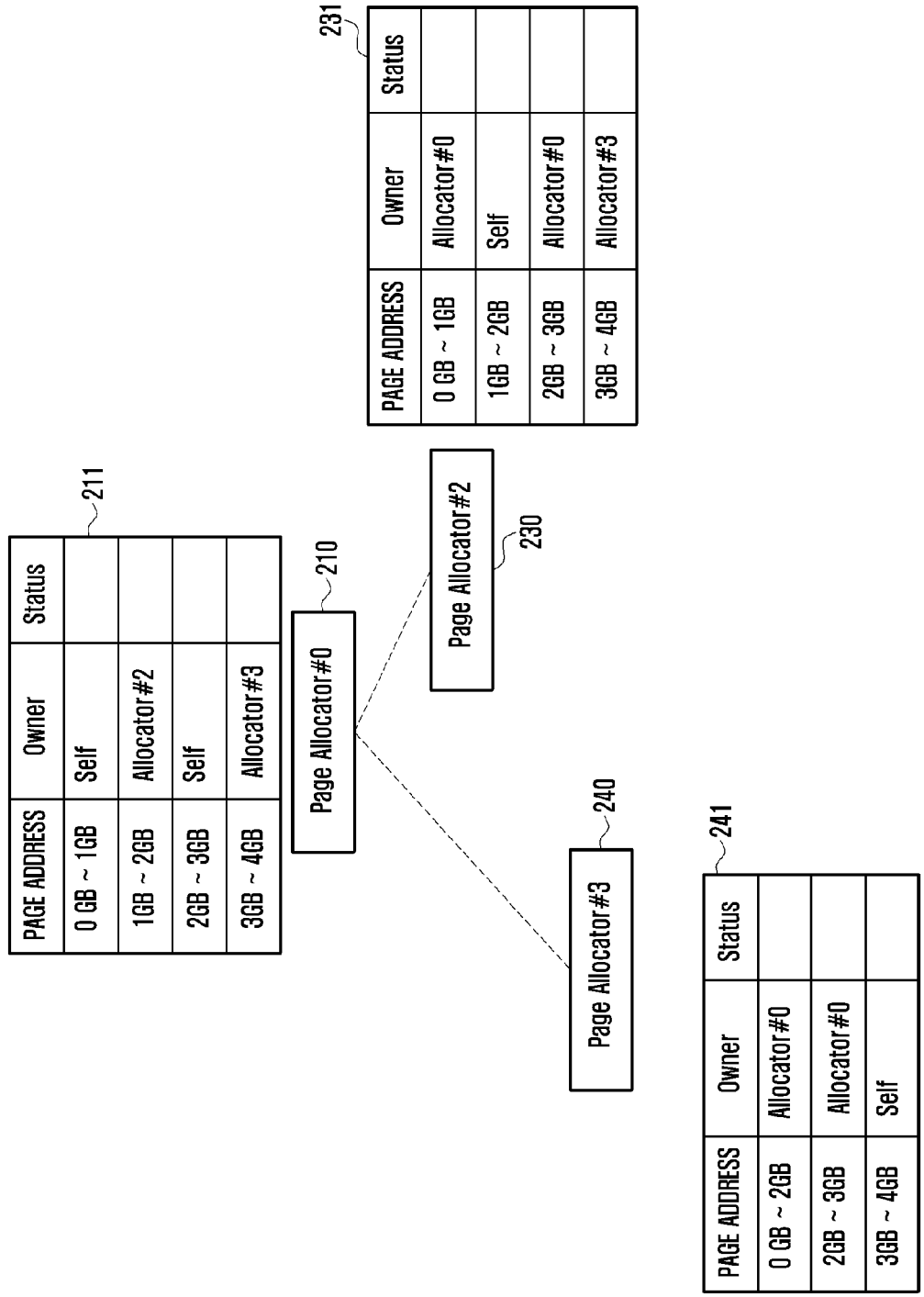

FIG. 13 schematically illustrates a result of merging the first page allocator 220 to the root page allocator 210.

Figure 14:
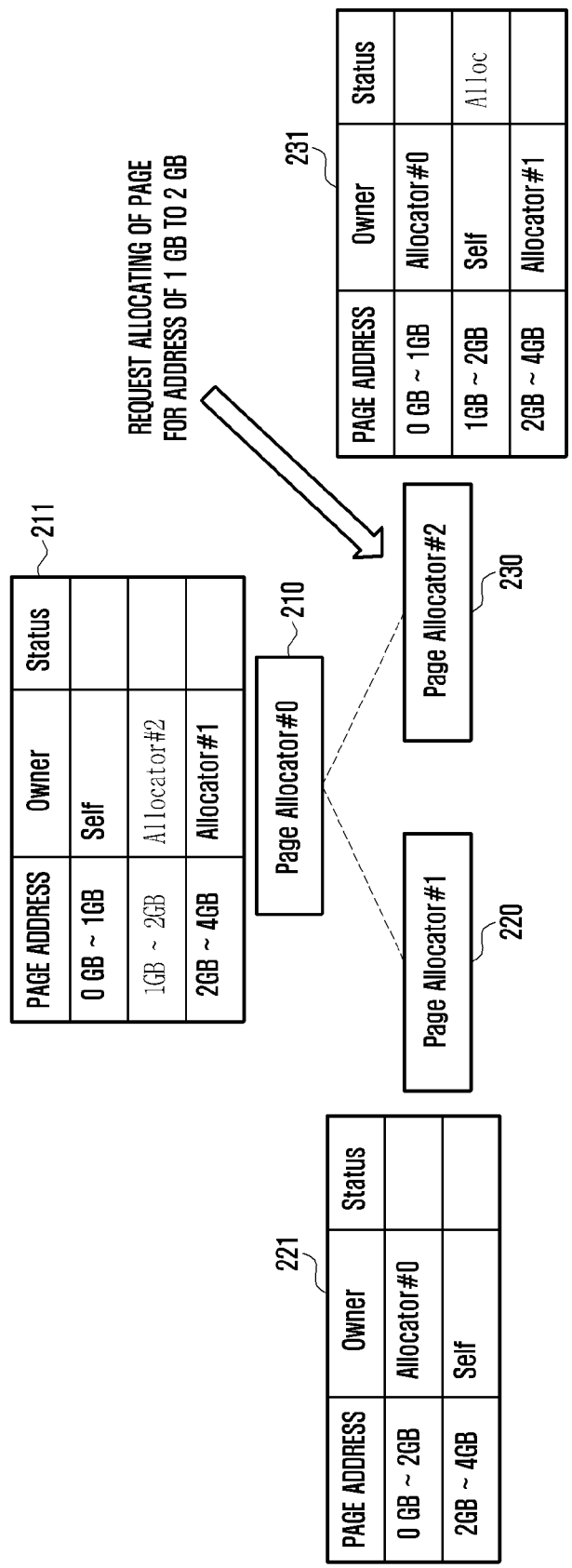
FIGS. 14 and 15 illustrate an operation of allocating a page in a dynamic page allocation system according to an exemplary embodiment.
Figure 15:
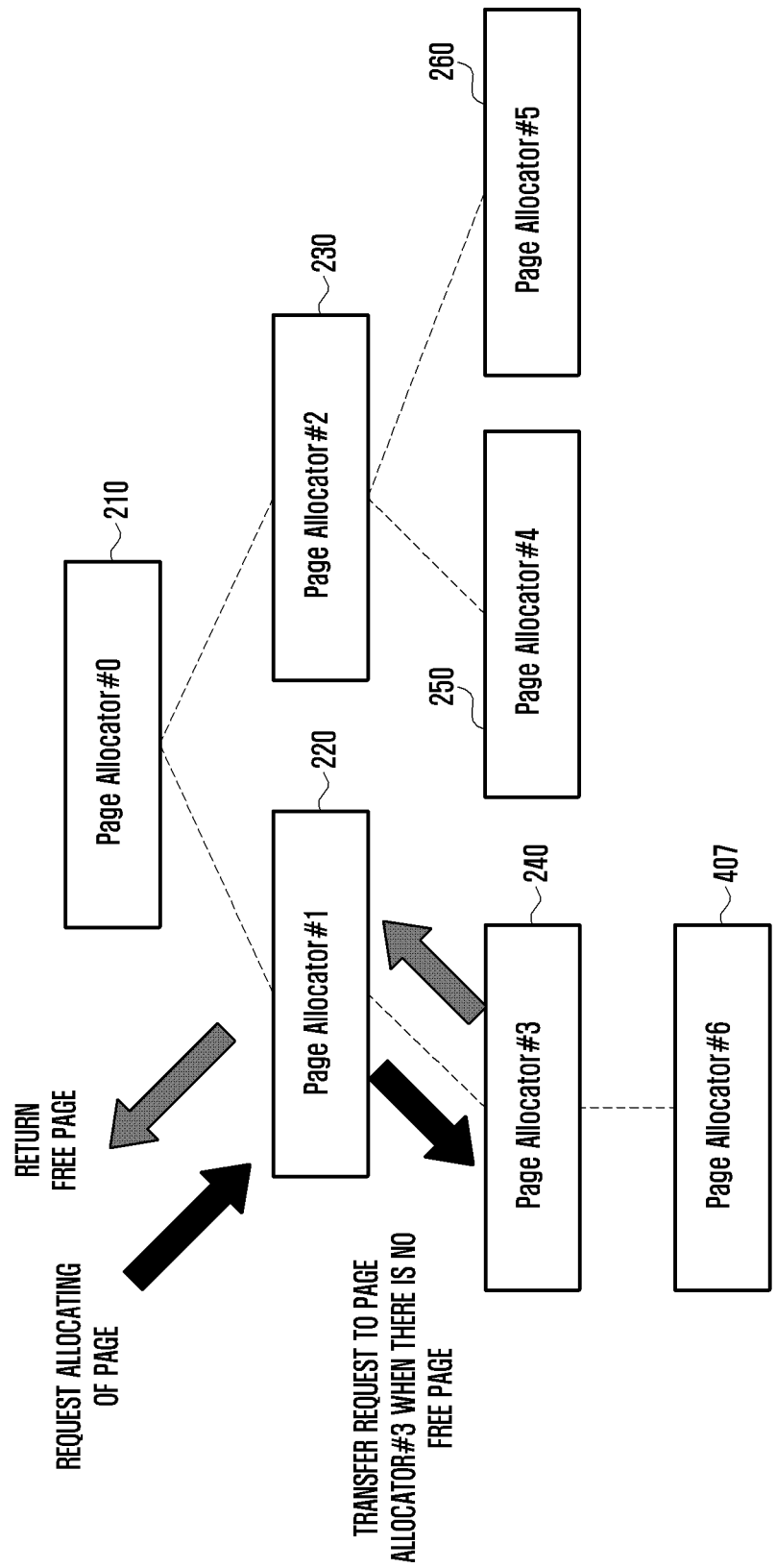

FIGS. 14 and 15 illustrate an operation of allocating a page in a dynamic page allocation system according to an exemplary embodiment.

A case where a page allocator owning a specific page range receives a request for allocating a page of the specific page range will be described with reference to FIG. 14.

For example, the second page allocator 230 corresponding to an owner of a page range of 1 GB to 2 GB may receive a request for allocating a page of the page range of 1 GB to 2 GB. According to the request for allocating the pages, the second page allocator 230 allocates the corresponding pages, and stores an allocation status "Alloc" as a status of the corresponding pages in the second page pool management data 231.

An operation in which a page allocator, which has received the request for allocating a page, copes with a case where the page allocator itself does not own any free pages will be described with reference to FIG. 15.

For example, if there is no page which can be allocated when the first page allocator 220 receives the request for allocating the pages, the first page allocator 220 may transfer the request for allocating the pages to the third page allocator 240 corresponding to its own child page allocator. The third page allocator 240 as the child page allocator which has received the request for allocating the pages from the first page allocator 220 as the parent page allocator may allocate free pages of the page range corresponding to the request for allocating the pages.

That is, the child page allocator may allocate the pages instead of the parent page allocator which does not own sufficient free pages.

Meanwhile, unlike the above-mentioned case, a page allocator may receive a request for deallocating a page range of which the page allocator is not an owner. This case will be described with reference to FIGS. 16 and 17.

Figure 16:
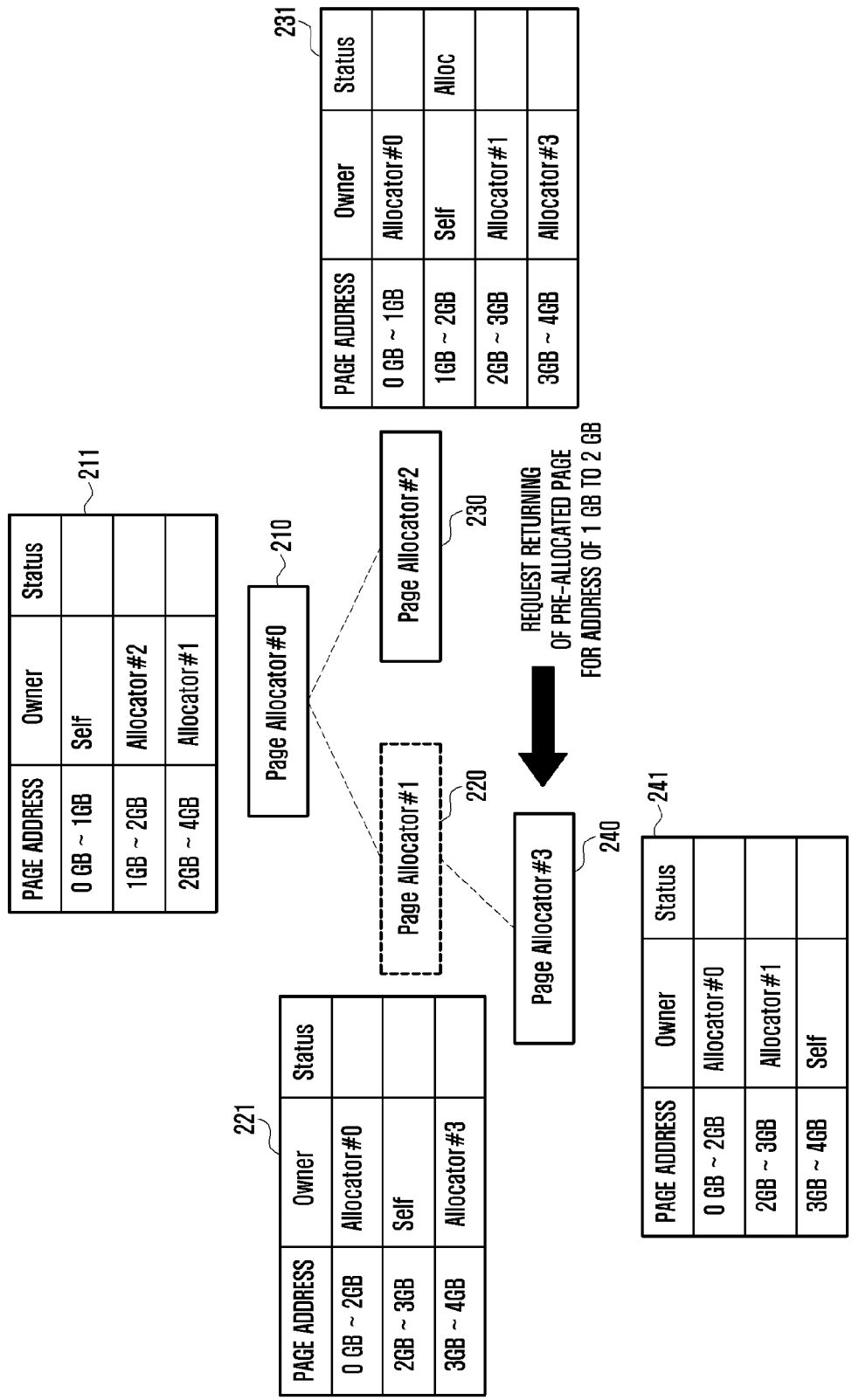
FIGS. 16 and 17 illustrate an operation of deallocating a page in a dynamic page allocation system according to an exemplary embodiment.

Referring to FIG. 16, for example, when an owner of a page range of 1 GB to 2 GB is the second page allocator Allocator #2 and the page range of 1 GB to 2 GB is an allocated status "Alloc", the third page allocator 240 may receive a request for deallocating a page of the page range of 1 GB to 2 GB.

Figure 17:
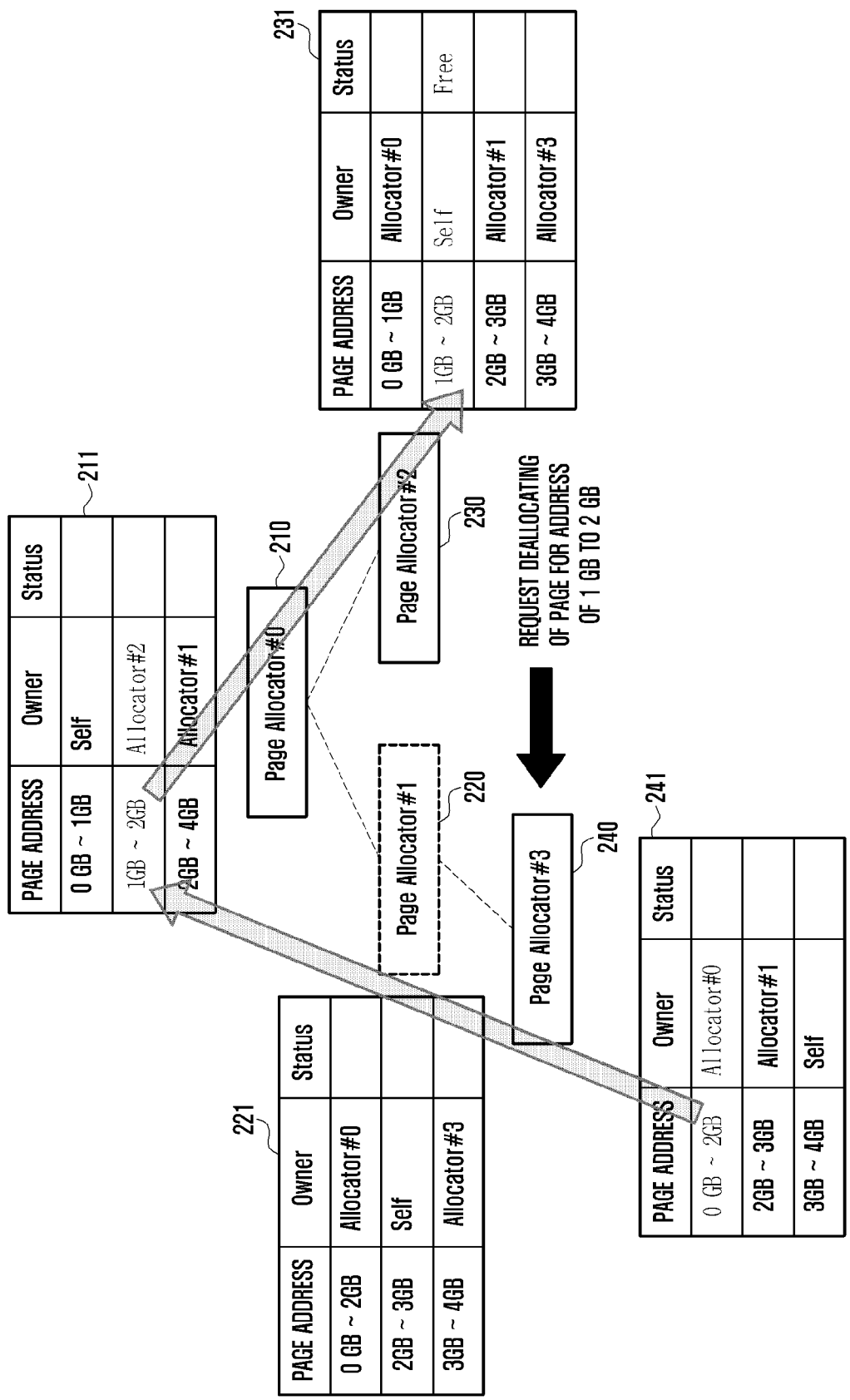

In this case, as illustrated in FIG. 17, the third page allocator 240 which has received the request of deallocating the page transfers the request of deallocating the page to the corresponding owner Allocator #0 of the corresponding page range of 1 GB to 2 GB which is stored in its own third page pool management data 241.

That is, the third page allocator 240 which has received the request for deallocating the page for the page range of 1 GB to 2 GB may transfer the request for deallocating the page for the page range of 1 GB to 2 GB to the root page allocator Allocator #0 which is stored in the third page pool management data 241 as the owner corresponding to the page range of 0 GB to 2 GB.

The root page allocator 210 which has received the request for deallocating the page for the page range of 1 GB to 2 GB from the third page allocator 240 identifies that the owner of the corresponding page range of 1 GB to 2 GB which is stored at its own root page pool management data 211 is the second page allocator Allocator #2, and transfers the request for deallocating the pages for the corresponding page range to the second page allocator 230.

Receiving the request for deallocating the pages for the page range of 1 GB to 2 GB from the root page allocator 210, the second page allocator 230 may identify that the owner of the page range of 1 GB to 2 GB which is stored at its own second page pool management data 231 is itself, and may deallocate a status of the page range of 1 GB to 2 GB to store a deallocated state as the status of the page range of 1 GB to 2 GB. That is, the second page allocator 230 changes the status of the page range of 1 GB to 2 GB to "Free".

In this way, in the system of dynamically allocating a page according to an exemplary embodiment, when a page allocator receives a request for deallocating specific pages of which the ownership does not belong thereto, the page allocator may transfer the request for deallocating the specific pages to a corresponding page allocator which is the owner of the specific pages stored at its own page pool management data table. Here, when the corresponding page allocator forks the ownership of the specific page range to another page allocator, the owner may be tracked by repeatedly transferring the request for deallocating the specific pages to the forked page allocator.

Figure 18:
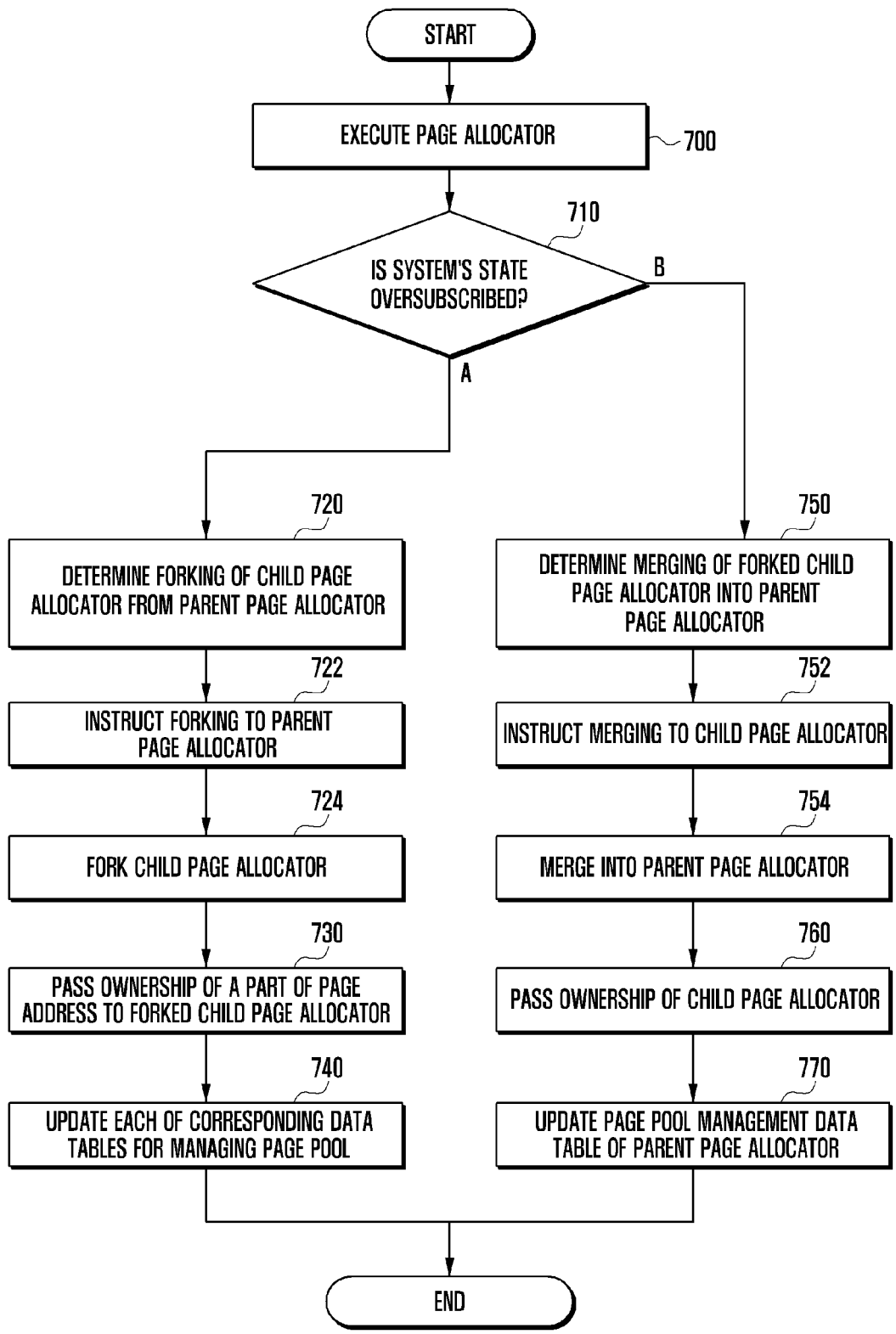
FIG. 18 is a flowchart illustrating a method of changing a dynamic page allocator according to an exemplary embodiment.

FIG. 18 is a flowchart illustrating a method of dynamically changing a page allocator according to an exemplary embodiment.

Referring to FIG. 18, at least one dynamic page allocator may be executed (operation 700). For example, a root page allocator corresponding to initialization of the dynamic page allocator system may be executed.

Next, the coordinator 100 may determine the system's state is in an oversubscribed state (operation 710). In detail, the coordinator 100 may determine the system's state as at least one state of a state where communication between the plurality of page allocators is in an overhead state, a state where the number of requests for allocating and/or deallocating a page by the page allocators becomes lower than a reference value or higher than a reference value, a state where a workload of the page allocators is smaller than a reference value or larger than a reference value, and a state where a size of the whole free page corresponding to the page allocators is smaller than a reference value or larger than a reference value.

When the coordinator 100 determines the system's state as in an oversubscribed state, i.e., at least one of a state where the number of requests for allocating and/or deallocating a page by the page allocator becomes more than a reference value, a state where a workload of the page allocator is larger than a reference value, and a state where a size of the whole free memory corresponding to the page allocator is larger than a reference value, the process may proceed to path A.

When the process proceeds to path A, the coordinator 100 may determine an operation of forking a child page allocator from a parent page allocator (operation 720).

Next, the coordinator 100 may instruct the forking operation to the parent page allocator (operation 722).

Next, the parent page allocator which has received the forking operation instruction by the coordinator 100 may generate a child page allocator to fork the child page allocator (operation 724).

Next, the parent page allocator may pass the ownership of some page addresses thereof to the forked child page allocator (operation 730).

Next, the parent page allocator and the child page allocator may update information on the changed ownership and store the updated information at its own page pool management data table, respectively.

That is, the ownership information of some page addresses changed by the child page forking operation may be updated and stored at the page pool management data table of the parent page allocator and the page pool management data table of the child page allocator.

Meanwhile, when the coordinator 100 determines the system's state as a non-oversubscribed state, i.e. at least one of a state where the number of requests for allocating and/or deallocating a page by the page allocators becomes lower than a reference value, a state where a workload of the page allocator is smaller than a reference value, and a state where a size of the whole free page corresponding to the page allocators is smaller than a reference value, the process may proceed to path B.

When the process proceeds to path B, the coordinator 100 may instruct a merging operation to the forked child page allocator (operation 752).

Next, the child page allocator which has received the merging operation instruction by the coordinator 100 may be merged to the parent page allocator (operation 754).

Next, the child page allocator may pass the ownership of a specific page address which the child page allocator owns to the parent page allocator to be merged (operation 760).

Next, the parent page allocator which has received the ownership of the specific page address from the child page allocator may update its own page pool management data table and store the updated information (operation 770).

That is, the parent page allocator may update information on the ownership of the specific page address which the child page allocator has owned, at the data page for managing a page pool of the parent page allocator, and store the updated information.

In accordance with a method and a system for dynamically changing a page allocator, a global page allocation scheme and a local page allocation scheme may be selectively used according to a system's state.

That is, in a state in which a workload of a page allocator is large, scalability may increase by partially applying a local page allocation scheme through a page allocator forking operation. In contrast, in a state in which the workload of the page allocator is small or a size of the whole free memory is small, memory fragmentation may be minimized by partially applying a global page allocation scheme through a merging operation.

Figure 19:
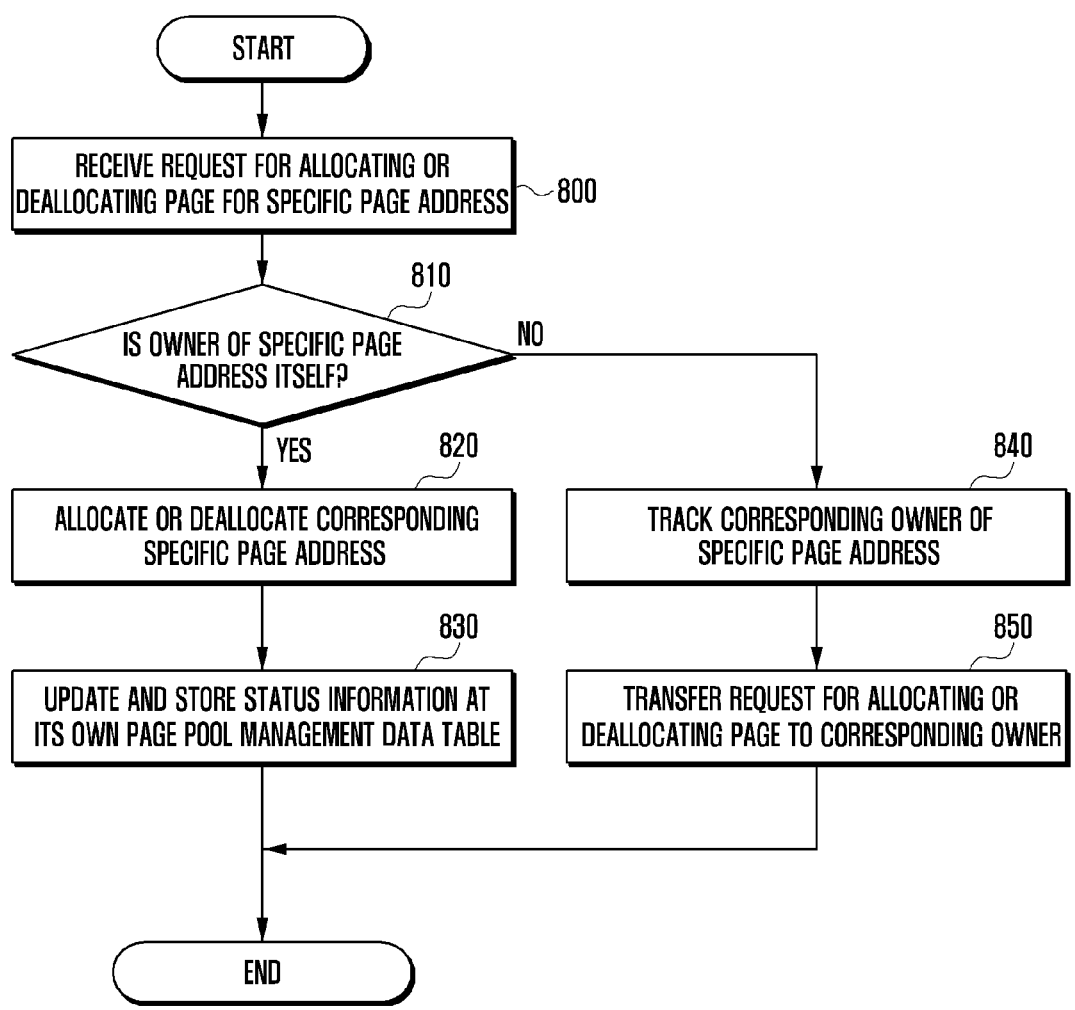
FIG. 19 is a flowchart illustrating a method of dynamically allocating or deallocating a page according to an exemplary embodiment.

FIG. 19 is a flowchart illustrating a method of dynamically allocating or deallocating a page according to an exemplary embodiment. In detail, a case of receiving a request for allocating or deallocating a page of a specific page address will be described with reference to FIG. 19.

Referring to FIG. 19, a page allocator may receive a request for allocating or deallocating a page of a specific page address (operation 800).

Next, the page allocator determines whether the owner of the specific page address is itself (operation 810). At this time, the page allocator may determine owner information of the specific page address through its own page pool management data table.

Next, when it is determined by the determination in operation 810 that the owner of the specific page address is itself, the page allocator may allocate or deallocate the pages corresponding to the specific page address (operation 820).

Next, the page allocator may update status information of the specific page address allocated or deallocated according to the request for allocating or deallocating the specific page and store the updated information at its own page pool management data table (operation 830).

Meanwhile, when it is determined by the determination in operation 810 that the owner of the specific page address is not itself, i.e. the owner is another page allocator, the page allocator may track the owner of the specific page address through its own page pool management data table (operation 840).

Next, the page allocator may transfer the request for allocating or deallocating the pages to the corresponding tracked owner (operation 850). The corresponding owner which has received the transferred request for allocating or deallocating the pages, that is, the corresponding page allocator, may allocate or deallocate the corresponding pages according to the transferred request for allocating or deallocating the pages. Further, the corresponding page allocator may update status information of the corresponding page address which has been allocated or deallocated and may store the updated status information at its own page pool management data table.

Figure 20:
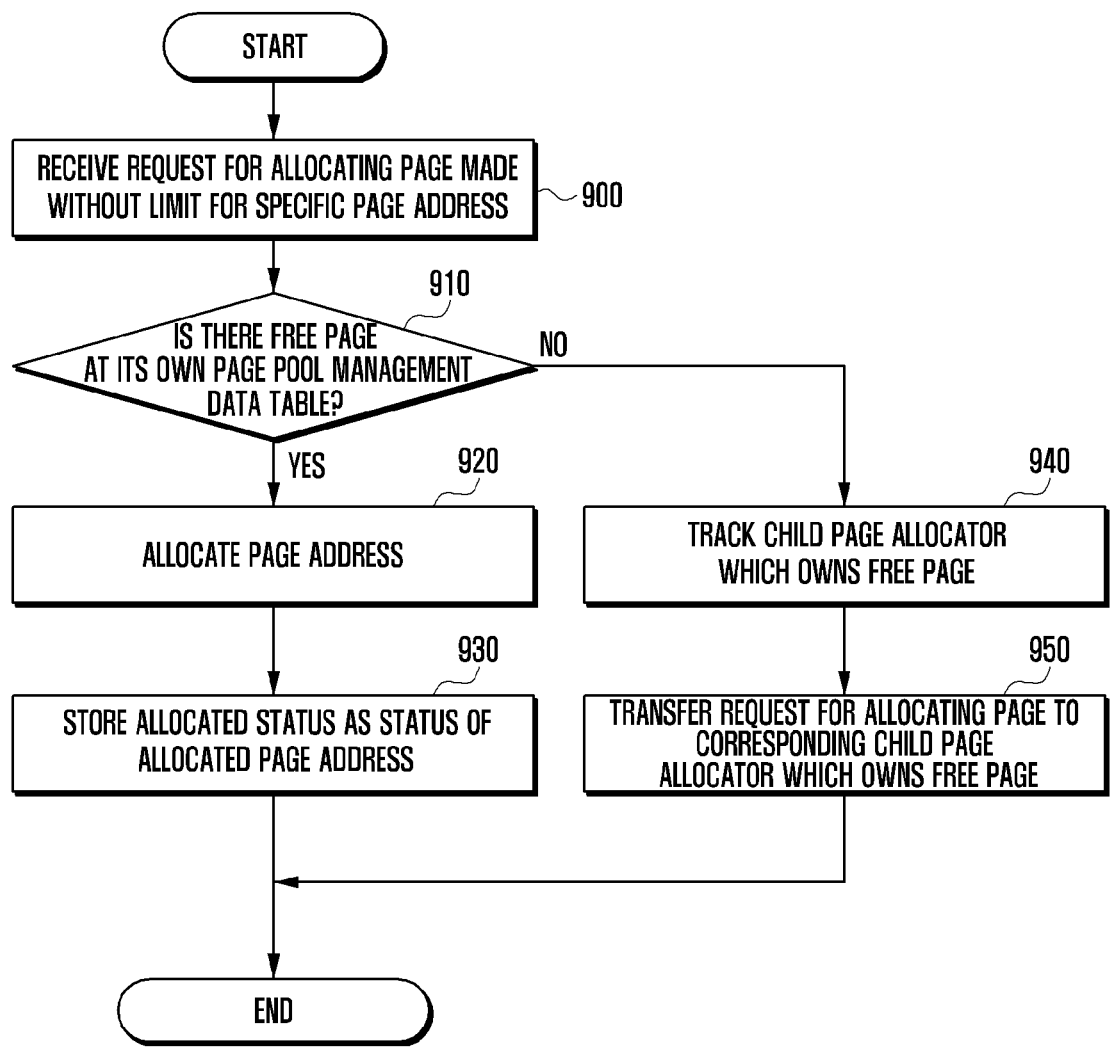
FIG. 20 is a flowchart illustrating a method of dynamically allocating a page according to an exemplary embodiment.

FIG. 20 is a flowchart illustrating a method of dynamically allocating a page according to an exemplary embodiment. In detail, a case of receiving a request for allocating a free page made without a limit for a specific page address will be described with reference to FIG. 20.

Referring to FIG. 20, a page allocator may receive a request for allocating a page made without a limit for a specific page address (operation 900).

Next, the page allocator may determine whether there is a free page which the page allocator owns, through its own page pool management data table (operation 910).

Next, when it is determined in operation 910 that there is a free page which the page allocator owns, the page allocator may allocate a free page address which the page allocator itself owns, in response to the request for allocating the pages (operation 920).

Next, the page allocator may update status information of the free page address to an allocated status "Alloc" and may store the updated status information at its own page pool management data table (operation 930).

Meanwhile, when it is determined in operation 910 that there is no free page which the page allocator owns, the page allocator may track a child page allocator owning a free page through the page pool management data table (operation 940).

Next, the page allocator may transfer the request for allocating the pages to the tracked child page allocator, that is, the child page allocator owning a free page (operation 950).

The corresponding child page allocator which received the request for allocating the free pages may allocate a free page address which the child page allocator owns, may update status information of the allocated free page address to an allocated status "Alloc", and may store the updated status information at its own page pool management data table.

In accordance with a method and a system for dynamically changing a page allocator of the exemplary embodiments, a global page allocation scheme and a local page allocation scheme may be selectively used according to a system's state.

That is, in a state in which a workload of a page allocator is large, scalability may be increased by partially applying a local page allocation scheme through a page allocator forking operation. In contrast, in a state in which the workload of the page allocator is small or a size of the whole free memory is small, memory fragmentation may be minimized by partially applying a global page allocation scheme through a merging operation.

Although the present inventive concept has been described through several embodiments, these embodiments are just exemplary and not limitative. In this way, it is understood by those skilled in the art to which the present inventive concept pertains that various variations and modifications may be made according to doctrine of equivalents without departing from the scope defined in appended claims.

What is claimed is:

1. A system of dynamically changing a page allocator, the system comprising:
a page allocator configured to allocate or deallocate a page corresponding to a memory address according to a request for allocating or deallocating the page; and
a coordinator configured to determine a state of the system, and fork a child page allocator from the page allocator, which serves as a parent page allocator, based on the determination,
wherein the coordinator is configured to, in response to determining that the state of the system is at least one of a state where a number of requests for allocating or deallocating a page of the page allocator becomes higher than a reference value, a state where a workload of the page allocator is larger than a reference value, and a state where a size of a whole free memory corresponding to the page allocator is larger than a reference value, fork the child page allocator from the parent page allocator.

2. The system of claim 1, wherein the coordinator is configured to merge the forked child page allocator into the parent allocator based on the determination.

3. The system of claim 2, wherein the coordinator is configured to perform the forking operation and the merging operation only between page allocators which are in a relation of parent and child.

4. The system of claim 2, wherein the child page allocator is configured to pass ownership of a memory address corresponding to the child page allocator to the parent page allocator in response to the child page allocator being merged into the parent page allocator.

5. The system of claim 2, wherein, in response to determining that the state of the system is at least one of a state where communication between the plurality of page allocators is in an overhead state, a state where a number of requests for allocating or deallocating a page by the page allocator becomes lower than a reference value, a state where a workload of the page allocator is smaller than a reference value, and a state where a size of a whole free memory is smaller than a reference value, the coordinator is configured to merge the child page allocator into the parent page allocator.

6. The system of claim 1, wherein the page allocator comprises a root page allocator corresponding to initialization of the system, by default.

7. The system of claim 6, wherein the page allocator comprises at least one parent page allocator and at least one child page allocator which are forked from the root page allocator and are in a relation of parent and child.

8. The system of claim 1, wherein the parent page allocator is configured to pass ownership of a part of a memory address corresponding to the parent page allocator to the child page allocator in response to the child page allocator being forked from the parent page allocator.

9. The system of claim 1, wherein each of the page allocators comprises a page pool management data table, and the page pool management data table stores a page address corresponding to a whole memory, an owner of the page address, and status information on allocation or deallocation of the page address.

10. The system of claim 9, wherein the page allocator is configured to identify whether an owner of a specific page address is the page allocator, through the page pool management data table of the page allocator, in response to receiving a request for allocating or deallocating a page of the specific page address, and to allocate or deallocate, when the owner of the specific page address is identified as the page allocator, the page corresponding to the specific page address, and to track, when the owner of the specific page address is identified as another page allocator, the owner of the specific page address through the page pool management data table and to transfer the request for allocating or deallocating the page to the page allocator corresponding to the tracked owner.

11. The system of claim 9, wherein, in response to receiving a request for allocating a page made without a limit for a specific page address, the page allocator is configured to identify whether there is a free page which the page allocator owns, through the page pool management data table of the page allocator, and to allocate, when it is identified there is the free page which the page allocator owns, a page address which the page allocator owns in response to the request for allocating the page, and to track, when it is identified that there is no free page which the page allocator owns, a child page allocator which owns a free page, through the page pool management data table of the page allocator, and to transfer the request for allocating the page to the tracked child page allocator.

12. The system of claim 11, wherein the page allocator is configured to sequentially transfer the request for allocating the page from the page allocator to the child page allocator along a family tree showing the relation of parent and child until finding a child page allocator which owns the free page.

13. A method of dynamically changing a page in a page allocation system, the method comprising:
determining a state of the page allocation system; and
forking a child page allocator from a parent page allocator, or merging a child page allocator into a parent page allocator, based on a result of the determining,
wherein, in response to determining that the state of the system is at least one of a state where a number of requests for allocating or deallocating a page becomes higher than a reference value, a state where an allocation workload is larger than a reference value, and a state where a size of a whole free memory corresponding to the page allocation system is larger than a reference value, the child page allocator is forked from the parent page allocator.

14. The method of claim 13, wherein the forking operation for the page allocator is performed in response to determining that the state of the system is at least one of a state where a number of requests of allocating or deallocating a page by the page allocator becomes higher than a reference value, a state where a workload of the page allocator is larger than a reference value, and a state where a size of a whole free memory corresponding to the page allocator is larger than a reference value, or wherein the merging operation between the parent page allocator and the child page allocator is performed in response to determining that the system's state is at least one of a state where communication between the parent page allocator and the child page allocator is in an overhead state, a state where a number of requests for allocating and/or deallocating a page by the page allocator becomes lower than a reference value, a state where a workload of the page allocator is smaller than a reference value, and a state where a size of a whole free memory is smaller than a reference value.

15. The method of claim 14, further comprising:
in response to the child page allocator being merged into the parent page allocator, passing ownership of a memory address corresponding to the child page allocator to the parent page allocator; and
updating the changed owner information in a page pool management data table of the parent page allocator, or in response to the child page allocator being forked from the parent page allocator, passing ownership for a part of a memory address corresponding to the parent page allocator to the child page allocator; and
updating information on a changed owner of the a part of the memory address at the page pool management data table of each of the parent and child page allocators.

16. The method of claim 14, further comprising:
receiving a request for allocating a page made without a limit for a specific page address, by the page allocator;
identifying whether there is a free page which the page allocator owns, through the page pool management data table of the page allocator, by the page allocator, and allocating, when it is identified that there is the free page which the page allocator owns, a page address which the page allocator itself owns, in response to the request for allocating the page, or
tracking, when it is identified that there is no free page which the page allocator itself owns a child page allocator owning a free page, through the page pool management data table of the page allocator and transferring the request for allocating the page to the tracked child page allocator.

17. The method of claim 14, further comprising:
receiving a request for allocating or deallocating a page of a specific page address, by the page allocator; and
identifying whether an owner of the specific page address is the page allocator itself, through the page pool management data table of the page allocator, by the page allocator, and in response to identifying that the owner of the specific page address is the page allocator itself, allocating or deallocating the page corresponding to the specific page address; and
storing status information on the allocated or deallocated page of the specific page address at the page pool management data table of the page allocator, or
in response to identifying that that the owner of the specific page address is another page allocator, tracking the owner of the specific page address through the page pool management data table of the page allocator; and
transferring the request for allocating or deallocating the page to the page allocator corresponding to the tracked owner.

18. The method of claim 17, further comprising:
allocating or deallocating a page corresponding to the specific page address according to the request for allocating or deallocating the page, by the page allocator corresponding to the tracked owner; and
updating status information of the allocated or deallocated page, and storing the updated status information in the page pool management data table of the page allocator corresponding to the tracked owner, by the page allocator corresponding to the tracked owner.

19. The method of claim 17, wherein the page allocator sequentially transfers the request for allocating the page from the page allocator to a child page allocator along a family tree showing the relation of parent and child until finding the child page allocator which owns the free page.

* * * * *